United States Patent
Kim et al.

(10) Patent No.: US 10,681,767 B2
(45) Date of Patent: Jun. 9, 2020

(54) METHOD AND APPARATUS FOR PERFORMING RRC CONNECTION RESUME IN WIRELESS COMMUNICATION SYSTEM

(71) Applicant: LG ELECTRONICS INC., Seoul (KR)

(72) Inventors: Taehun Kim, Seoul (KR); Jaewook Lee, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 16/075,112

(22) PCT Filed: Feb. 6, 2017

(86) PCT No.: PCT/KR2017/001269
§ 371 (c)(1),
(2) Date: Aug. 2, 2018

(87) PCT Pub. No.: WO2017/135779
PCT Pub. Date: Aug. 10, 2017

(65) Prior Publication Data
US 2019/0045572 A1    Feb. 7, 2019

Related U.S. Application Data

(60) Provisional application No. 62/292,200, filed on Feb. 5, 2016, provisional application No. 62/335,634, filed on May 12, 2016.

(51) Int. Cl.
*H04W 76/19*    (2018.01)
*H04W 76/20*    (2018.01)
(Continued)

(52) U.S. Cl.
CPC .......... *H04W 76/19* (2018.02); *H04W 76/10* (2018.02); *H04W 76/20* (2018.02); *H04W 76/30* (2018.02)

(58) Field of Classification Search
CPC ..... H04W 76/19; H04W 76/20; H04W 76/30; H04W 76/10
See application file for complete search history.

(56) References Cited

U.S. PATENT DOCUMENTS 8,768,305 B1    7/2014  Singh et al.
2012/0179789 A1*  7/2012  Griot .............. G06F 15/177
(Continued)

FOREIGN PATENT DOCUMENTS

| EP | 2645804 | 10/2013 |
|---|---|---|
| WO | 2009075341 | 6/2009 |
| WO | 2013107391 | 7/2013 |

OTHER PUBLICATIONS

PCT International Application No. PCT/KR2017/001269, Written Opinion of the International Searching Authority dated May 12, 2017, 17 pages.

*Primary Examiner* — Ronald B Abelson
(74) *Attorney, Agent, or Firm* — Lee, Hong, Degerman, Kang & Waimey

(57) ABSTRACT

Disclosed is a method for effectively performing a non-access stratum (NAS) rejection when performing RRC connection resume in a wireless communication system. A method for performing, by a base station, radio resource control (RRC) connection resume in a wireless communication system, includes performing an RRC connection resume procedure with a user equipment (UE), transmitting a resume request message to a mobile management entity (MME), and receiving a resume failure message including (Continued)

an NAS rejection cause from the MME when the resume request has not been permitted.

11 Claims, 16 Drawing Sheets

(51) Int. Cl.
*H04W 76/10* (2018.01)
*H04W 76/30* (2018.01)

(56) References Cited

U.S. PATENT DOCUMENTS

| | | |
|---|---|---|
| 2013/0039339 A1 | 2/2013 | Rayavarapu et al. |
| 2016/0212638 A1* | 7/2016 | Jain ........................ H04W 24/02 |
| 2018/0110092 A1* | 4/2018 | Liu ......................... H04W 76/19 |

* cited by examiner

E-UTRAN                EPC (a) UE-P-GW user plane with E-UTRAN (b) Control Plane UE-MME

METHOD AND APPARATUS FOR PERFORMING RRC CONNECTION RESUME IN WIRELESS COMMUNICATION SYSTEM

CROSS-REFERENCE TO RELATED APPLICATIONS

This application is the National Stage filing under 35 U.S.C. 371 of International Application No. PCT/KR2017/001269, filed on Feb. 6, 2017, which claims the benefit of U.S. Provisional Application No. 62/292,200, filed on Feb. 5, 2016, and 62/335,634, filed on May 12, 2016, the contents of which are all hereby incorporated by reference herein in their entirety.

TECHNICAL FIELD

The following description relates to a wireless communication system, and more particularly to a method and apparatus for performing radio resource control (RRC) connection resume in a wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive radio technology, multiple antenna (MIMO) technology for increasing data capacity in a restricted frequency, multiple-base-station cooperative technology, etc. have been highlighted.

Meanwhile, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

DISCLOSURE

Technical Problem

An object of the present disclosure devised to solve the problem lies in a method for performing RRC connection resume in a wireless communication system.

The technical objects that can be achieved through the present invention are not limited to what has been particularly described hereinabove and other technical objects not described herein will be more clearly understood by persons skilled in the art from the following detailed description.

Technical Solutions

In accordance with one aspect of the present disclosure, a method for performing a radio resource control (RRC) connection resume procedure by a base station (BS) in a wireless communication system comprises performing a procedure for resuming RRC connection to a user equipment (UE), transmitting a resume request message to a mobility management entity (MME), and receiving a resume failure message from the MME when the resume request is not admitted, wherein the resume failure message includes a non-access stratum (NAS) rejection cause.

In accordance with another aspect of the present disclosure, a base station (BS) for performing a radio resource control (RRC) connection resume procedure by a base station (BS) in a wireless communication system comprises a radio frequency (RF) unit, and a processor configured to control the RF unit. The processor performs a procedure for resuming RRC connection to a user equipment (UE), transmits a resume request message to a mobility management entity (MME), and receives a resume failure message from the MME when the resume request is not admitted, wherein the resume failure message includes a non-access stratum (NAS) rejection cause.

In accordance with another aspect of the present disclosure, a method for transmitting a signal by a mobility management entity (MME) in a wireless communication system comprises receiving a resume request message from a base station (BS) configured to perform a radio resource control (RRC) connection resume procedure, determining whether a resume request is admitted on the basis of the resume request message, and transmitting a resume failure message to the base station (BS) when the resume request is not admitted, wherein the resume failure message includes a non-access stratum (NAS) rejection cause.

The method may further include transmitting an RRC message including the NAS rejection cause to the user equipment (UE).

The RRC message may be at least one of an RRC connection reconfiguration message and a downlink (DL) information transfer message.

The method may further include performing an RRC connection release procedure based on the resume failure message.

When the RRC connection release procedure is performed before the RRC message is transmitted to the user equipment (UE), the RRC message may be an RRC connection release message.

The performing the RRC connection resume procedure may include receiving an RRC connection resume complete message from the user equipment (UE).

When the RRC connection resume complete message includes a NAS message, the NAS message may be discarded after reception of the resume failure message.

The resume request message may be an S1-AP UE context resume request message.

The resume request message or the resume failure message may not include a NAS message.

The resume failure message may be an S1-AP UE context resume failure message.

The resume failure message may further include a back-off timer value.

Advantageous Effects

As is apparent from the above description, the embodiments of the present disclosure may perform RRC connection resume in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
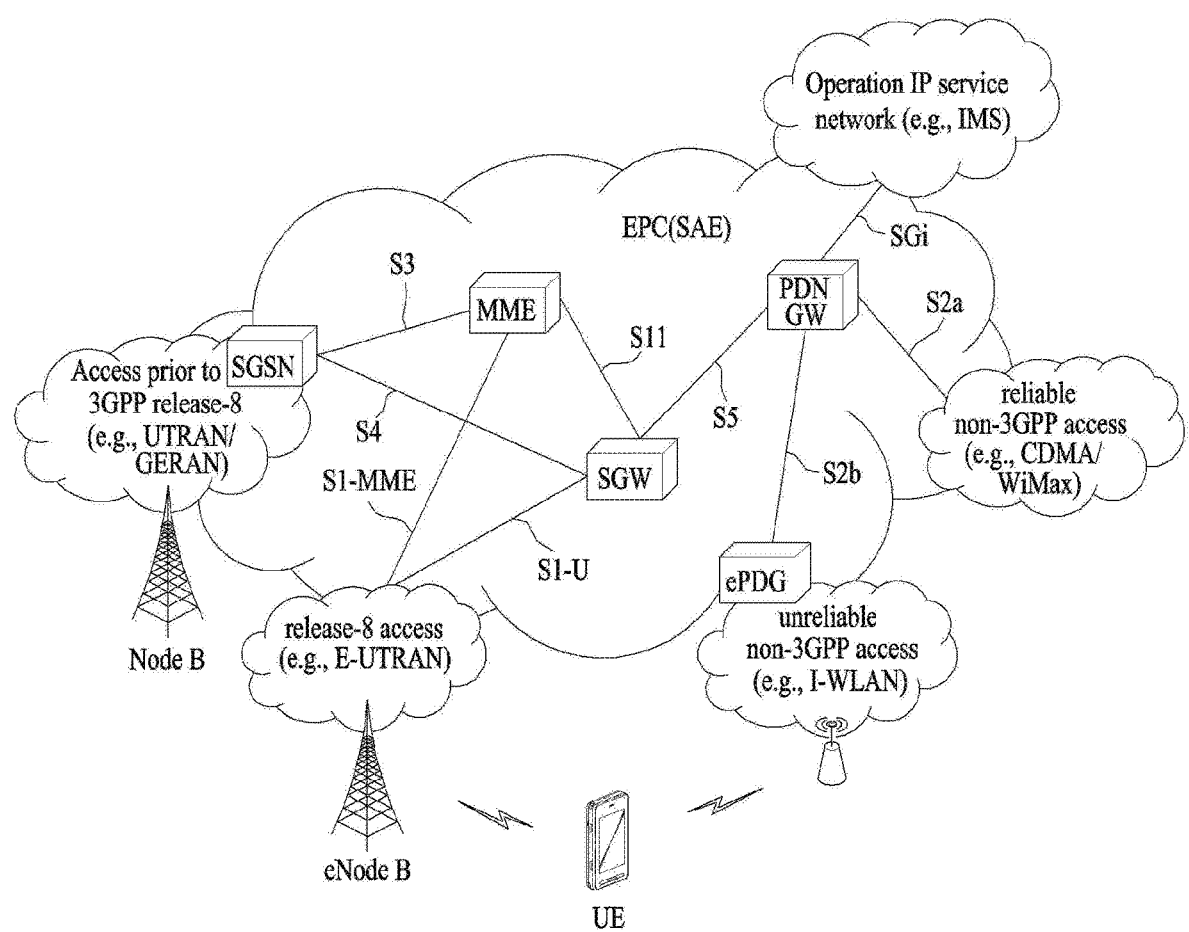
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an S1 signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an |

TABLE 1-continued

| Reference Point | Description |
|---|---|
| | operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
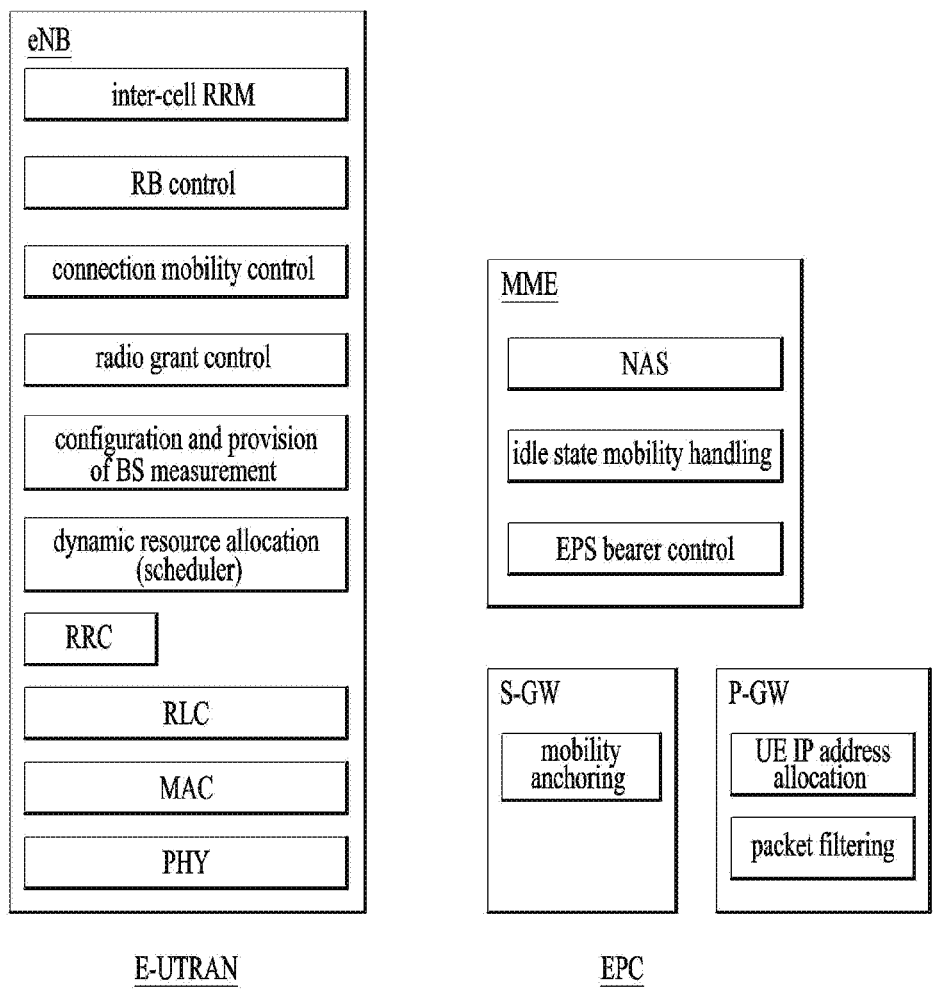
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
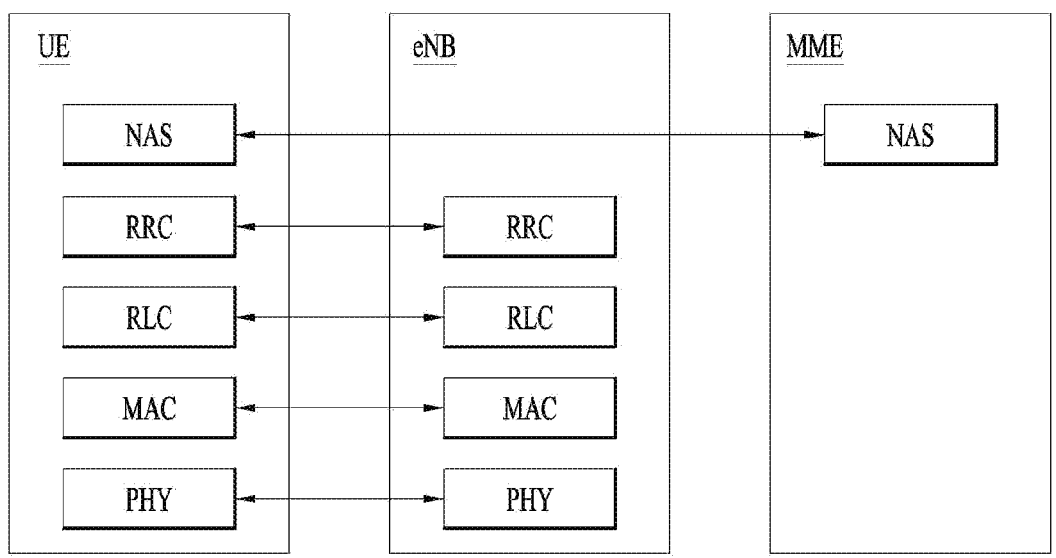
FIG. 3 is a diagram exemplarily illustrating the structure of a radio interface protocol in a control plane.
Figure 4:
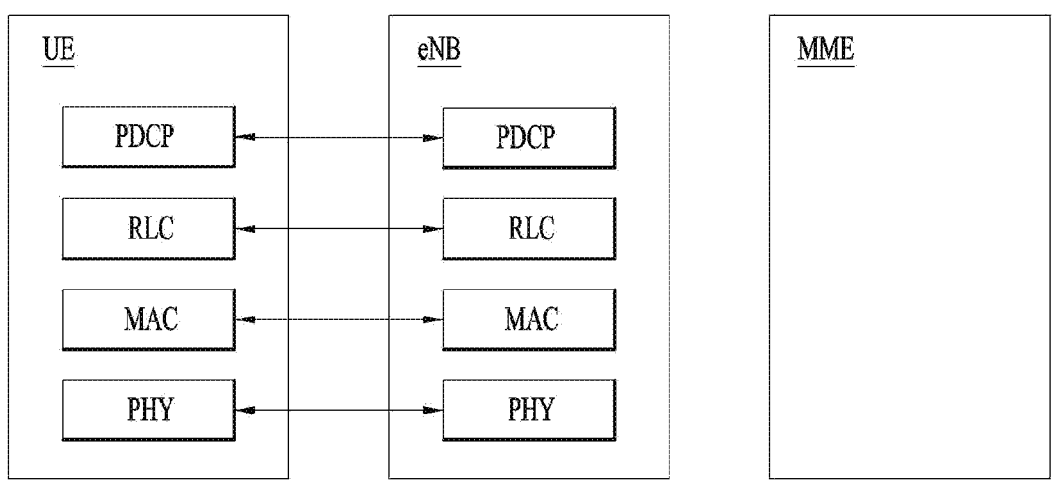
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
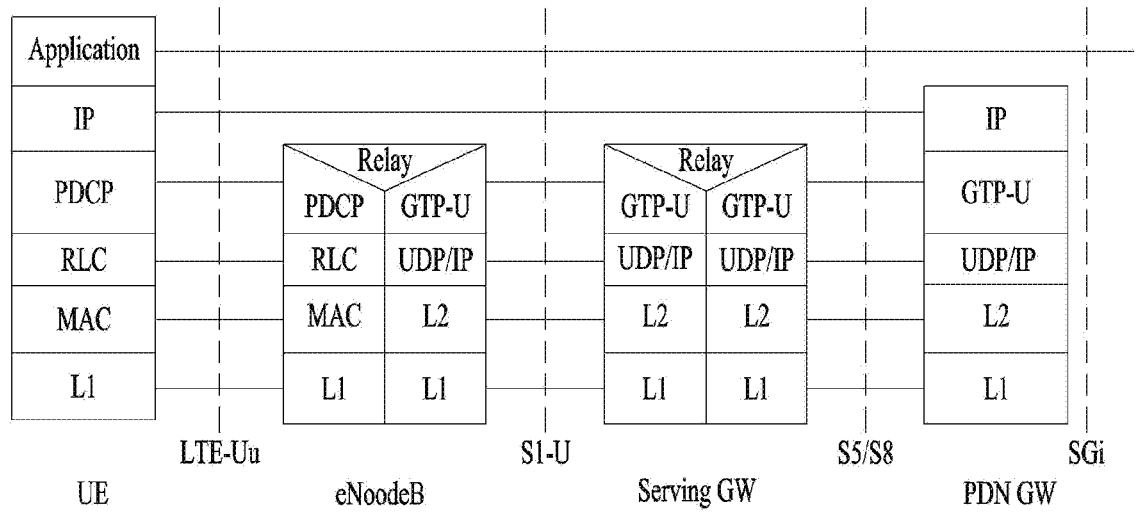
FIG. 5 is a diagram illustrating LTE (Long Term Evolution) protocol stacks for a user plane and a control plane.
Figure 5:
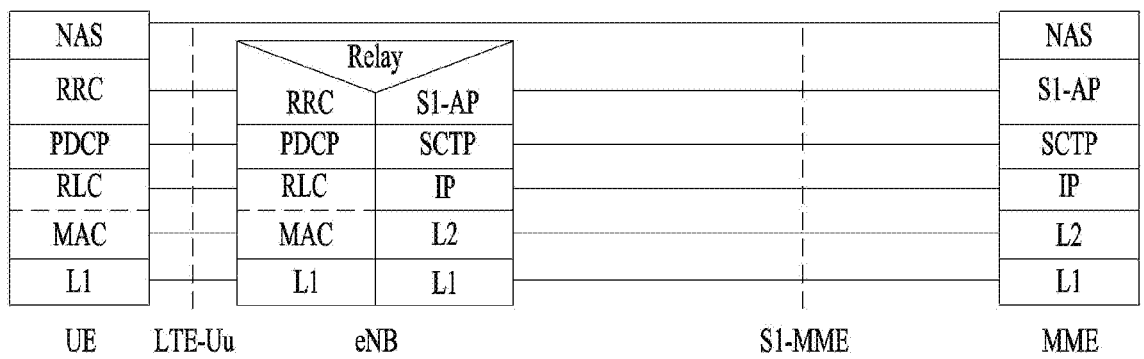

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
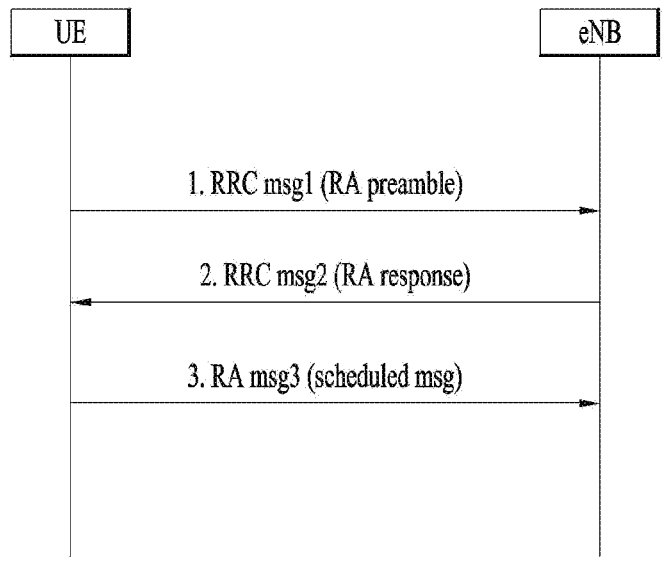
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
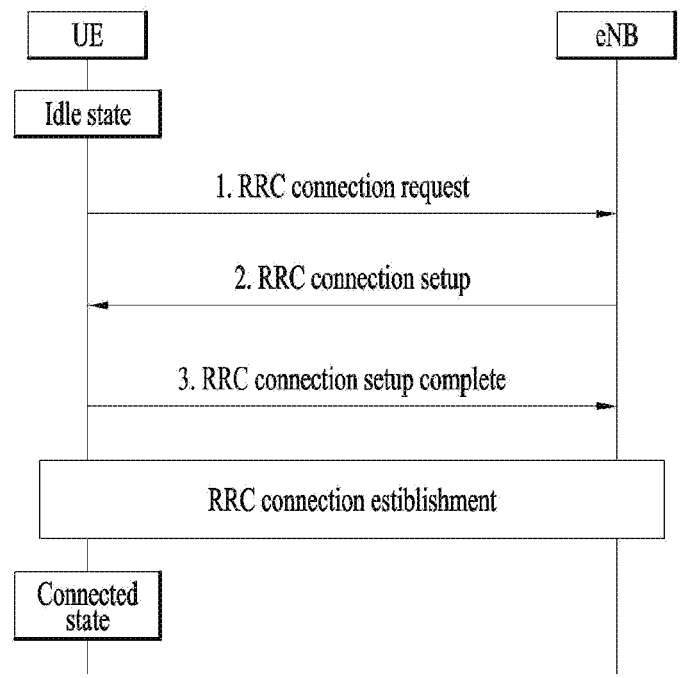
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Hereinafter, a network triggered service request procedure will be described in brief. If an MME has or needs to transmit downlink data or signals to an UE in the ECM-IDLE state, for example, if the MME needs to perform the MME/HSS-initiated detach procedure for the ECM-IDLE mode UE or an S-GW receives control signaling (e.g. Create Bearer Request or Modify Bearer Request), the MME starts the network triggered service request procedure. When the S-GW receives Create Bearer Request or Modify Bearer Request for a UE in the state that ISR is activated, the S-GW does not have a downlink S1-U, and an SGSN has notified the S-GW that the UE has moved to an PMM-IDLE or STANDBY state, the S-GW buffers signaling messages and transmits Downlink Data Notification to trigger the MME and SGSN to page the UE. If the S-GW is triggered to send second Downlink Data Notification for a bearer with higher priority (i.e. ARP priority level) than that for which the first Downlink Data Notification was sent while waiting for the user plane to be established, the S-GW sends a new Downlink Data Notification message indicating the higher priority to the MME. If the S-GW receives additional downlink data packets for a bearer with same or higher priority than that for which the first Downlink Data Notification was sent, or if after sensing a second Downlink Data Notification message indicating the higher priority, the S-GW receives additional downlink data packets for the UE, the S-GW buffers these downlink data packets and does not send new Downlink Data Notification. The S-GW will be notified about the current RAT type based on a UE triggered service request procedure. In addition, the S-GW will keep executing a dedicated bearer activation or dedicated bearer modification procedure. That is, the S-GW will send corresponding buffered signaling to the MME or SGSN where UE resides in now and inform a P-GW of the current RAT type if the RAT type has been changed compared to the last reported RAT Type. If dynamic PCC is deployed, the current RAT type information can be conveyed from the P-GW to a PCRF. If PCRF response leads to EPS bearer modification, the P-GW initiates a bearer update procedure. When sending the Downlink Data Notification, the S-GW includes both an EPS bearer ID and ARP. If the Downlink Data Notification is triggered by the arrival of downlink data packets at the S-GW, the S-GW includes an EPS bearer ID and ARP associated with the bearer through which the downlink data packet was received. If the Downlink Data Notification is triggered by the arrival of control signaling and if the control signaling includes an EPS bearer ID and ARP, the S-GW includes the corresponding EPS bearer ID and APR. If the ARP is not present in the control signaling, the S-GW includes an ARP in a stored EPS bearer context. When an L-GW receives downlink data for a UE in the ECM-IDLE state, if a LIPA PDN connection exists, the L-GW sends the first downlink user packet to the S-GW and buffers all other downlink user packets. The S-GW triggers the MME to page the UE. Details of the network triggered service request procedure can be found in section 5.3.4.3 of 3GPP TS 23.401.

Figure 8:
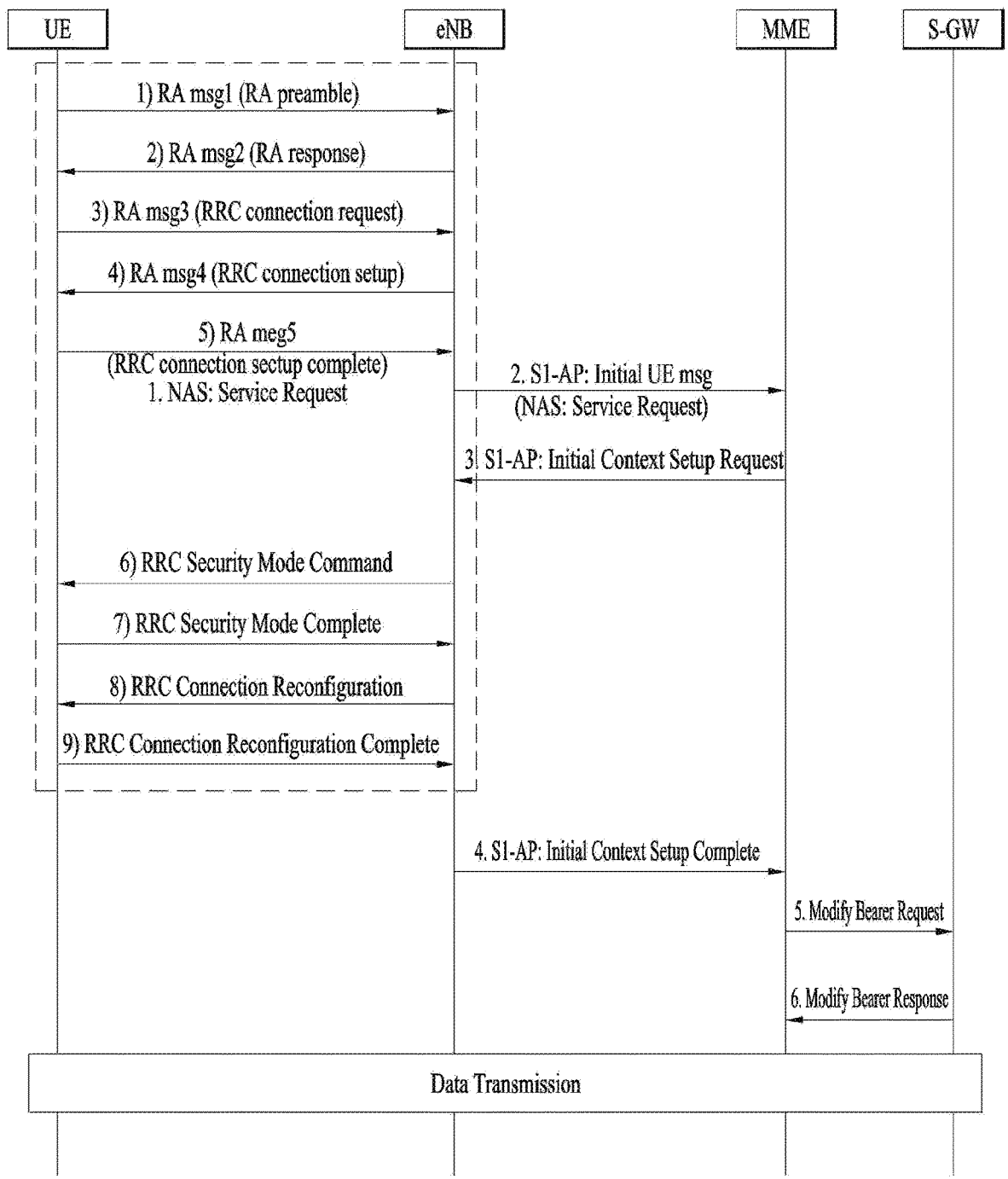
FIG. 8 illustrates a UE triggered Service Request procedure.

FIG. 8 illustrates a UE triggered service request procedure.

Referring to FIG. 8, when a UE has traffic to be transmitted, the UE sends to an eNB an RRC connection request through a random access procedure, that is, by performing steps 1) to 3). When the eNB accepts the RRC connection request from the UE, the eNB sends an RRC Connection Setup message to the UE. Upon receiving the RRC Connection Setup message, the UE sends an RRC Connection Setup Complete message to the eNB by including a service request in the message. This will be described in detail with respect to a service request between a UE and MME.
1. The UE sends NAS message Service Request towards the MME encapsulated in an RRC message (e.g. RA msg5 of FIG. 8) to the eNB.
2. The eNB forwards NAS message to MME. NAS message is encapsulated in an S1-AP.
3. The MME sends an S1-Ap Initial Context Setup Request message to the eNB. In this step, radio and S1 bearers are activated for all activate EPS bearers. The eNB stores a security context, MME signaling connection ID, EPS bearer QoS(s), etc. in a UE context.

The eNB performs a radio bearer establishment procedure. The radio bearer establishment procedure includes steps 6) to 9) illustrated in FIG. 8.
4. The eNB sends S1-AP message Initial Context Setup Request to the MME.
5. The MME sends a Modify Bearer Request message for each PDN connection to an S-GW.
6. The S-GW returns Modify Bearer Response to the MME in response to the Modify Bearer Request message.

Thereafter, traffic is transmitted/received via the E-RAB established through the service request procedure.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support 'IoT' devices characterized as ultra-low complexity, power limitation and low data rates.

In the prior art, an EMM-Idle mode UE should establish a connection with the network to transmit data. To this end, the UE should successfully complete the service request procedure illustrated in FIG. 8, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

User Plane CIoT EPS Optimization

A user plane EPS optimization function may support user plane data transmission without using a service request procedure in which an access stratum (AS) context is reconfigured by a serving eNodeB and a UE. As a precondition to the user plane CIoT EPS optimization function, there is a need for the UE to perform an initial access configuration procedure for establishing the AS bearer and the AS security context over a network. In a subsequent transaction trigger, the UE may suppress issuance of a subsequent service request until the UE is able to use the AS context (Refer to 3GPP standard documents TS 24.301 and TS 36.300). Instead of the issuance of the subsequent service request, the UE may start a connection resume procedure. If the connection resume procedure fails, the UE may re-perform the connection resume procedure according to an indication message of the base station (BS), or may start a conventional (legacy) NAS procedure. In order to maintain the operation for allowing the UE, which moves between cells constructed on different eNodeBs, to support user plane EPS optimization, the AS context should be transmitted between the eNodeBs (Refer to 3GPP standard documents TS 36.300 and TS 36.423).

Connection Suspend Procedure

The connection suspend procedure may be used for the network that is configured to perform connection suspend when the UE and the network support user plane EPS optimization (Refer to 3GPP standard document TS 36.300). In this case, the connection suspend procedure can be explained as follows.

During transition to the ECM-Idle (or EMM-Idle) mode, the UE may store AS information.

eNodeB may store the AS information and SLAP association and bearer context about the UE therein.

MME may store the S1AP association and bearer context about the UE, and may enter the ECM-Idle mode in which a suspend indication message exists. In this case, the UE and the eNodeB may store AS information associated with the ECM-Idle mode.

Figure 9:
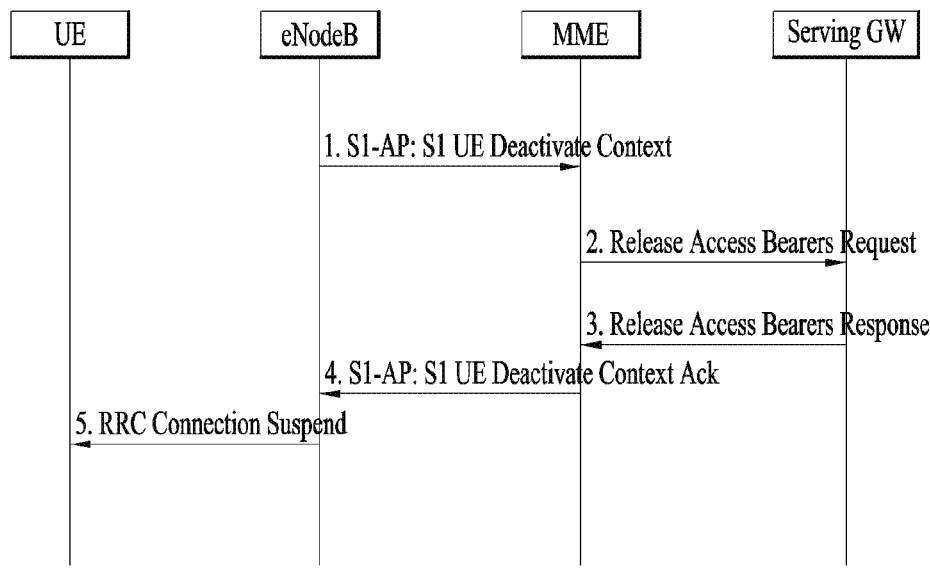
FIG. 9 is a conceptual diagram illustrating a method for allowing a base station (BS) to start a connection suspend procedure according to an embodiment of the present invention.

FIG. 9 is a conceptual diagram illustrating a method for allowing the eNodeB (or BS) to start the connection suspend procedure according to an embodiment of the present invention. Referring to FIG. 9, the operation for allowing the eNodeB to perform the connection suspend procedure is as follows.
1. The eNB may inform the MME of a suspend state of RRC connection of the UE so as to enter the ECM-Idle mode. In this case, not only S1AP association needed to resume RRC connection, but also data associated with UE context and bearer context can be maintained by the eNB, the UE, and the MME (Refer to 3GPP standard document TS 36.413).
2. MME may transmit a Release Access Bearers Request message for requesting release of all S1-U bearers about the UE to the serving GW.
3. The serving GW may release all eNodeB associated information (address and downlink TEIDs) about the UE, and may answer the MME using the Release Access Bearers Response message. In this case, other components of the serving GW context of the UE may not be affected. Upon receiving a downlink (DL) packet about the UE, the serving GW may buffer the received DL packet associated with the UE, and may start a network triggered service request procedure. In this case, if it is possible for a PDN to use a function according to operator policy, an indication message about abnormal release of the received radio link may be used by the serving GW in a subsequent decision process such that the serving GW can trigger a PDN charging suspend state in the subsequent decision process.
4. Thereafter, the serving GW may inform the MME of S1-U bearer release using the Release Access Bearer Response message.
5. The eNodeB (eNB) may transmit the RRC message such that the eNodeB can suspend RRC connection about the UE.

Connection Resume Procedure

The connection resume procedure may allow the UE to resume ECM connection when the UE and the network support user plane EPS optimization and the UE stores information needed to perform the connection resume procedure. The connection resume procedure is as follows.

UE may resume connection to the network using the stored AS information using the connection suspend procedure.

Potentially, a new eNB may inform the MME of information indicating that connection to UE has been stably resumed and the MME has entered the ECM-Connected mode.

Under the condition that the MME, which has the stored S1AP association information about the UE, receives an EMM procedure for the UE through another UE-associated logical S1-connection about the UE, receives a tracking area (TA) update procedure along with MME change information, or receives an SGSN context request, when the UE is re-attached or detached, the eNB having been associated with the MME may delete the stored S1AP association using the S1 release procedure.

Figure 10:
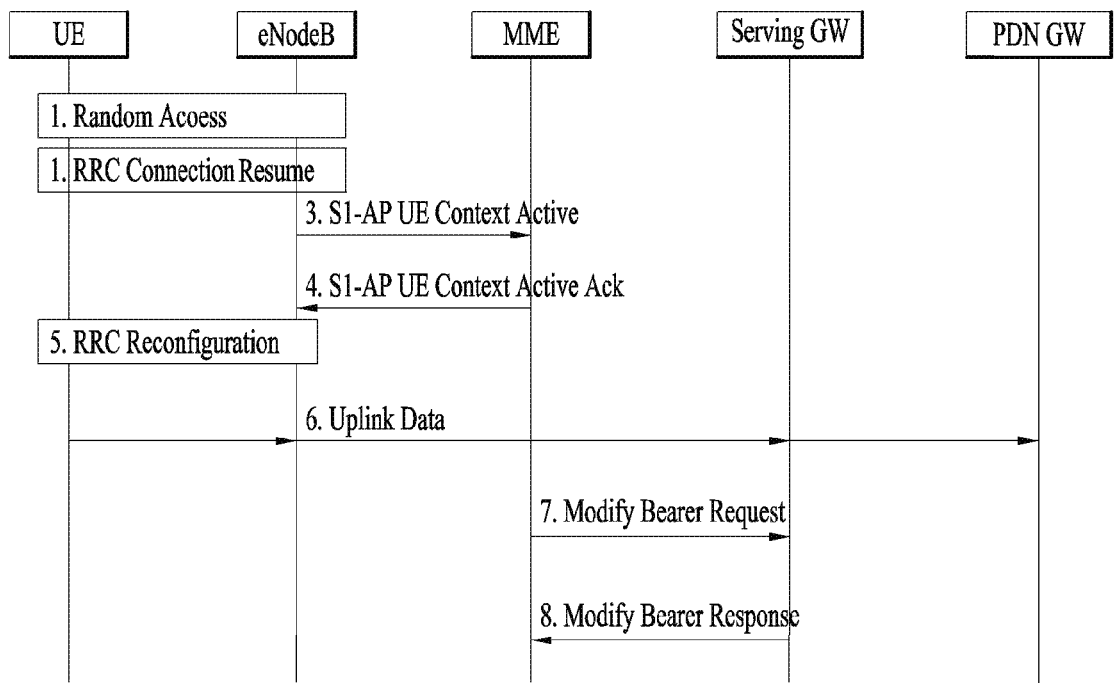
FIG. 10 is a conceptual diagram illustrating a method for allowing a user equipment (UE) to perform a connection resume procedure according to an embodiment of the present invention.

FIG. 10 is a conceptual diagram illustrating a method for allowing a user equipment (UE) to perform a connection resume procedure according to an embodiment of the present invention. Referring to FIG. 10, the procedure for allowing the UE to perform connection resume is as follows.
1. UE may trigger a random access procedure about the eNB.
2. UE may trigger the RRC connection resume procedure including information needed for the eNB scheduled to access the stored AS context of the UE. In this case, E-UTRAN may perform security inspection. In addition, the eNB may provide the list of resumed radio bearers to the UE. EPS bearer status synchronization may be performed between the UE and the network. That is, the radio bearer is not configured in the UE, and the UE must locally remove the EPS bearer instead of the control plane EPS bearer. If the radio bearer about the default EPS bearer is not configured, the UE must locally deactivate all EPS bearers associated with the corresponding basic EPS bearer.
3. eNB may inform the MME of the S1-AP UE Context Active message including the list of rejected EPS bearers, such that the eNB may inform the MME of the resumed state of UE RRC connection resume (Refer to 3GPP standard document TS 36.413). MME may enter the ECM-CONNECTED state. MME may identify whether the MME has returned to the eNB which stores data relevant to S1AP association and UE context and bearer context each having DL TEID needed to perform connection resume. If the default EPS bearer is not admitted by the eNB, all EPS bearers associated with the default bearer may be treated as non-accepted bearers. The MME may trigger the bearer release procedure, such that the non-accepted and non-established bearer may be released.
4. MME may indicate connection resume using an S1-AP UE Context Active Acknowledgement message including the list of rejected EPS bearers.
5. If the MME is contained in the list of rejected EPS bearers in step 4, the eNB may reconfigure the radio bearer.
6. UL data from the UE may be forwarded to the serving GW by the eNB. The eNB may transmit the UL data using the stored serving GW address and TEID during the connection resume procedure. The serving GW may transmit UL data to a PDN GW.
7. MME may transmit a Modify Bearer Request message (including eNB address, S1 TEID(s) (DL) about the admitted EPS bearers, a delay DL packet notification request, a RAT type, etc.) to the serving GW at intervals of PDN connection. When the serving GW supports a procedure for modifying the access bearer request and need not transmit signaling information to the PDN GW, the MME may transmit a Modify Access Bearers Request (including the eNB address and TEID of a DL user plane about the admitted EPS bearer, a delay DL packet notification request, etc.) for each UE to the serving GW, such that the serving GW can optimize signaling. The serving GW may transmit DL data to the UE. If configuration is completed, the MME and the serving GW may remember that arbitrary buffered DL data has been transferred to the UE designed to use a power saving function, and may then delete a DL data buffer expiration time from the UE context so as to avoid unnecessary user plane installation associated with TAU.
8. The serving GW may return the Modify Bearer Response message (including a serving GW address and a UL traffic associated TEID, etc.) acting as a response to the Modify Bearer Request message, to the MME, or may return a Modify Access Bearers Response (including the serving GW address, the UL traffic associated TEID, etc.) message acting as a response to the Modify Access Bearers Request message, to the MME.

When a PMIP is used through S5/S8 interface, assuming that the serving GW is unable to service an MME request through the Modify Access Bearers Request message without using either S5/S8 signaling other than the charging suspend release of the PDN GW or Gxc signaling, the serving GW must answer the MME through information indicating that modifications are not restricted to the S1-U bearer, and the MME may repeatedly perform requesting using the Modify Bearer Request message whenever PDN connection is achieved.

If SIPTO of a local network is activated about stand-alone GW deployment and PDN connection and a stand-alone local home network ID accessed by the UE is different from a local home network ID through which the UE starts SIPTO @ LN PDN connection, the MME may request release of the SIPTO connection through a local network PDN connection having a "reactivation requested" cause value. If the UE does not have another PDN connection, the MME may initiate an "explicit detach with reattach required" procedure.

If the SIPTO of the local network is activated in collocated LGW deployment and PDN connection, and if an L-GW CN address of a cell accessed by the UE is different from an L-GW CN address of a cell in which the UE initiates SIPTO in the local network PDN connection, MME may request SIPTO connection release through the local network PDN connection having the "reactivation requested" cause value. If the UE does not have another PDN connection, the MME may initiate the "explicit detach with reattach required" procedure.

UE Context Suspend

An object of the UE context suspend procedure is to control the E-UTRAN and EPC to suspend the UE context, the UE-associated logical S1-connection, and associated bearer context.

Figure 11:
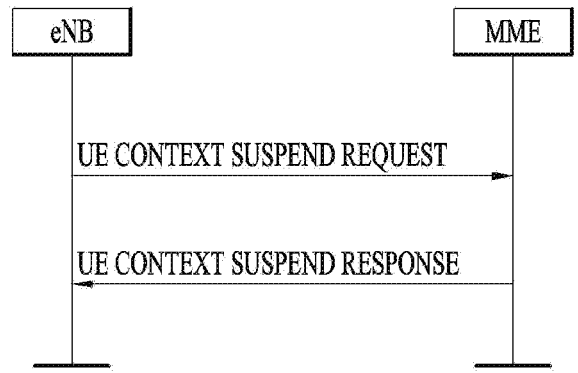
FIG. 11 is a conceptual diagram illustrating a method for successfully performing a UE context suspend procedure in an S1-AP duration according to an embodiment of the present invention.

FIG. 11 is a conceptual diagram illustrating a method for successfully performing the UE context suspend procedure in an S1-AP duration according to an embodiment of the present invention.

Referring to FIG. 11, the eNB may start the UE context suspend procedure by transmitting the UE CONTEXT SUSPEND REQUEST message to the MME. Upon receiving the UE CONTEXT SUSPEND REQUEST message, the MME may operate according to information defined in the 3GPP standard document TS 23.401. Upon receiving the UE CONTEXT SUSPEND RESPONSE message, the eNB may perform UE context suspend, the UE-associated logical S1-connection and the associated bearer context may enable the UE to enter the RRC_IDLE mode.

If information on recommended cells and eNBs for a paging IE is contained in the UE CONTEXT SUSPEND REQUEST message, the MME may store the above information and may use the stored information for subsequent paging.

UE Context Resume

A UE context resume procedure may transmit a necessary request message to the MME, such that the MME can recognize information indicating that the UE has resumed the suspended RRC connection, and the UE context contained in EPC, the UE-associated logical S1-connection, and the associated bearer contexts can be resumed through the above request message.

Figure 12:
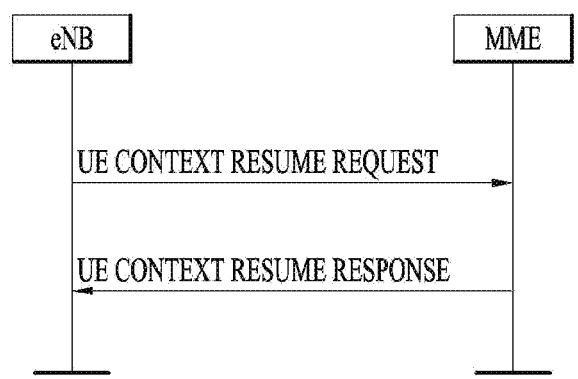
FIG. 12 is a conceptual diagram illustrating a method for successfully performing a UE context resume procedure in an S1-AP duration according to an embodiment of the present invention.

FIG. 12 is a conceptual diagram illustrating a method for successfully performing a UE context resume procedure in an S1-AP duration according to an embodiment of the present invention.

Referring to FIG. 12, the eNB may start the UE context resume procedure by transmitting the UE CONTEXT RESUME REQUEST message to the MME. If it is impossible for the eNB to admit all the suspended E-RABs, the eNB must display the corresponding information through "E-RABs Failed To Resume List IE".

Upon receiving the UE CONTEXT RESUME REQUEST message, the MME may operate according to information defined in 3GPP standard document TS 23.401, and may answer the eNB using the UE CONTEXT RESUME RESPONSE message. If it is impossible for the MME to admit all the suspended E-RABs, the MME may display the corresponding information through "E-RABs Failed To Resume List IE".

Figure 13:
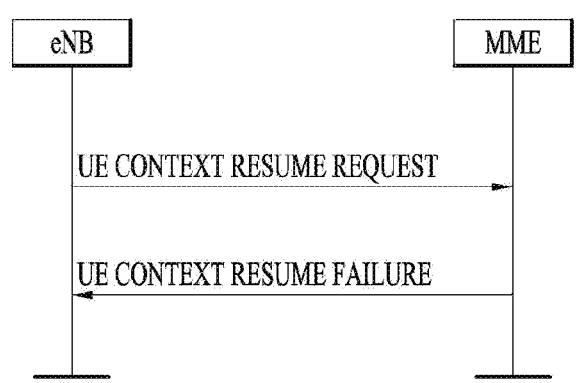
FIG. 13 is a conceptual diagram illustrating a failure example of a UE context resume procedure in an S1-AP duration according to an embodiment of the present invention.

FIG. 13 is a conceptual diagram illustrating a failure example of the UE context resume procedure in the S1-AP duration according to an embodiment of the present invention.

Referring to FIG. 13, if the MME is unable to resume a single E-RAB, the MME transmits the UE CONTEXT RESUME FAILURE message to the eNB such that the MME informs the eNB of information indicating that the UE context, the UE-associated logical S1-connection, and the associated bearer context remain suspended. Upon receiving the UE CONTEXT RESUME FAILURE message, the eNB may reject a request message for RRC connection resume as defined in 3GPP standard document TS36.331.

NAS Signal Connection Suspend and Resume

If user plane EPS optimization is used, NAS signal connection suspend may be initiated by the network during an EMM connection mode. Resume of the suspended NAS signal connection may be initiated by the UE.

If user plane EPS optimization is performed by the UE, the following operations can be carried out.

If an indication message indicating RRC connection suspend is received from a lower layer, the UE may not consider the released NAS signal connection whereas the UE can enter the EMM-IDLE mode in which the suspend indication message occurs.

Under the condition that the UE stays in the EMM-IDLE mode having the suspend indication message, if the procedure for requesting the initial NAS message service or the procedure for requesting the extended service is triggered, the UE may transmit a request message to the lower layer such that RRC connection can be resumed. Through the above request message for the lower layer, the NAS may provide RRC establishment cause and call type information to the lower layer.

Upon receiving the message indicating RRC connection resume from the lower layer during the EMM-IDLE mode having the suspend indication message, the UE may enter the EMM-CONNECTED mode. If a SERVICE REQUEST message is pending, it is impossible to transmit the message. If an initial NAS message different from the SERVICE REQUEST message is pending, it is possible to transmit the message. If the NAS message is discarded and is not transmitted over the network, an uplink (UL) NAS COUNT value corresponding to the NAS message may be re-used for a subsequent UL NAS message to be transmitted.

If RRC connection resume fails in the EMM-IDLE mode having the suspend indication message, the UE may enter the EMM-IDLE mode irrespective of the suspend indication message, may re-transmit an initial NAS procedure message of a standby mode or may restart the ongoing NAS procedure.

When user plane EPS optimization is used in the network, the following operations can be carried out.

If an indication message indicating RRC connection suspend is received from a lower layer, the network may not consider the released NAS signal connection whereas the network can switch to the EMM-IDLE mode having the suspend indication message.

Upon receiving an indication message indicating RRC connection resume from the lower layer during the EMM-IDLE mode having the suspend indication message, the network may enter the EMM-CONNECTED mode.

S1-AP Message for NAS Message Transport

A detailed description of a message for NAS message transport is as follows. Here, an initial UE message may be an S1-AP message for transporting (or transmitting) a first UL NAS message, and a downlink (DL) NAS TRANSPORT message may be an S1-AP message for transporting a downlink (DL) NAS message.

Figure 14:
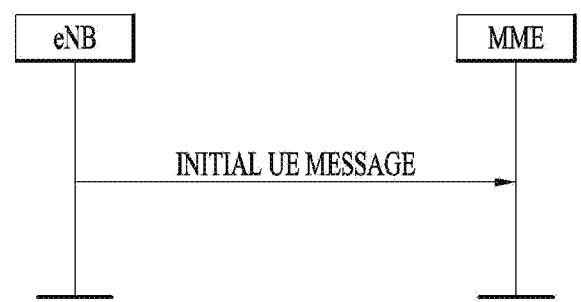
FIG. 14 is a conceptual diagram illustrating an initial UE message transmission procedure according to an embodiment of the present invention.

FIG. 14 is a conceptual diagram illustrating an initial UE message transmission (or transport) procedure according to an embodiment of the present invention.

Referring to FIG. 14, if the eNB receives an initial UL NAS message, which has been transmitted through RRC connection needed for MME forwarding, from the radio interface, the eNB may retrieve the NAS transmission procedure, and may transmit the initial UE message having the NAS message as a NAS-PDU IE, to the MME. The eNB may perform allocation of a unique eNB UE S1AP ID to be used for the UE, and may include this ID in the initial UE message. In the case of network sharing, a selected PLMN may be indicated by a PLMN Identify IE contained in a TAI IE included in the initial UE message. If the eNB receives an S-TMSI IE from the radio interface, the eNB may include the S-TMSI IE in the initial UE message. If the eNB does not support an NNSF and receives a GUMMEI IE from the radio interface, the eNB may allow the GUMMEI IE to be included in the initial UE message. If the eNB does not support the NNSF and receives a GUMMEI Type IE from the radio interface, the eNB may allow the GUMMEI Type IE to be included in the initial UE message.

Downlink (DL) NAS Transmission

Figure 15:
FIG. 15 is a conceptual diagram illustrating a downlink (DL) NAS transmission procedure according to an embodiment of the present invention.

FIG. 15 is a conceptual diagram illustrating a downlink (DL) NAS transmission procedure according to an embodiment of the present invention.

Referring to FIG. 15, under the condition that there is a need for the MME to transparently transmit the NAS message to the UE through the eNB, if the UE-associated logical S1-connection is present for the UE or if the MME receives an eNB UE S1AP ID IE through the initial UE message, the MME may transmit a DOWNLINK NAS TRANSPORT message including the NAS message, as a NAS-PDU UE, to the eNB.

If the UE-associated logical S1-connection is not configured, the MME may perform allocation of a unique MME UE S1AP ID to be used by the UE, and may allow the allocation result to be included in the DOWNLINK NAS TRANSPORT message. Upon receiving the MME UE S1AP ID IE through the DOWNLINK NAS TRANSPORT message, the eNB may configure UE-associated logical S1-connection. The NAS-PDU IE may include an MME-UE message that is transmitted without being interpreted by the eNB.

S1-AP Message for Resume Procedure

A detailed description of a message for the NAS message transport is as follows.

A UE CONTEXT RESUME REQUEST message may inform the MME that the UE has resumed the suspended RRC connection, or may transmit a necessary request message to the MME such that the UE context, the UE-associated logical S1-connection, and the associated bearer context can be resumed in EPC.

If the MME having received the UE CONTEXT RESUME REQUEST message is unable to resume the single E-RAB, the MME may transmit a UE CONTEXT RESUME FAILURE message to the eNB. The eNB having received the UE CONTEXT RESUME FAILURE message may release RRC connection. In other words, the eNB may release RRC connection and all signals and user data transport resources associated with the RRC connection release. In another example, the MME may transmit a UE CONTEXT RESUME RESPONSE message to the eNB.

ECM-IDLE

If NAS signaling connection is not present between the UE and the network, this means that the UE is in the ECM-IDLE mode. During the ECM-IDLE mode, the UE may perform cell selection or cell re-selection according to PLMN selection based on 3GPP standard documents TS 36.304 and TS 23.122. In association with the UE staying in the ECM-IDLE mode other than the RRC connection suspended UE, UE context is not present in E-UTRAN. S1_MME and S1_U connection about the UE staying in the ECM-IDLE mode are not present.

In EMM-REGISTERED and ECM-IDLE states, the UE may operate as follows.

If a current TA is not present in a TA list which has been received from the network so as to perform registration maintenance and UE paging of the MME, the UE may perform tracking area (TA) update.

In order to inform the EPC of a UE available status, the tracking area (TA) update procedure can be carried out.

If RRC connection is released by "load balancing TAU required" release cause, the UE may perform tracking area (TA) update.

When a UE may re-select an E-UTRAN cell and a TIN of the UE indicates "P-TMSI", the UE may perform tracking area (TA) update.

Tracking area (TA) update for either core network performance information of the UE or modification of UE-specific DRX parameters can be carried out.

If a change in UE condition requires modification of the extended idle mode DRX parameters received from the MME, the UE may perform TA update.

If the UE manually selects a CSG cell and a CSG ID and associated PLMN of the selected cell are not present in both the admitted CSG list of the UE and the operator CSG list of the UE, the UE may perform TA update.

If the UE answers to the paging from the MME by performing the service request procedure, or if RRC connection of the UE is suspended, the UE may initiate the connection resume procedure.

If the service request procedure is performed or RRC connection of the UE is suspended during UL user data transmission, the UE may start the connection resume procedure.

If signaling connection is configured between the UE and the MME, the UE and the MME may enter the ECM-CONNECTED mode. An initial NAS message by which switching from the ECM-IDLE mode to the ECM-CONNECTED mode is started may be any one of an Attach Request, a Tracking Area Update Request, a Service Request and a Detach Request. If the UE is in the ECM-IDLE mode, the UE and the network may operate in an asynchronous manner That is, the UE and the network may have different sets of established EPS bearers. When the UE and the MME enter the ECM CONNECTED mode, the set of EPS Bearers may be synchronized between the UE and the network.

If the UE (NAS layer) is in the ECM-IDLE (or EMM-IDLE) mode having the suspend indication message, and if any of procedures of using the initial NAS message start operation, user plane EPS optimization can be used. If the UE is in the service request procedure from among the procedures of using the initial NAS message, the operation for performing the connection resume procedure can be carried out as follows.

- If the UE answers to the paging from the MME by executing the service request procedure or if the UE suspends RRC connection thereof, the UE may start the connection resume procedure.
- If the service request procedure is performed or the UE RRC connection is suspended so as to configure the radio bearer during UL user data transmission, the UE may starts the connection resume procedure.

As described above, if the paging message is received or UL data to be sent is found, a legacy UE has been designed to perform the service request procedure. However, when a UE (NAS layer) can use user plane EPS optimization and suspends RRC connection, the UE may perform the connection resume procedure.

Figure 16:
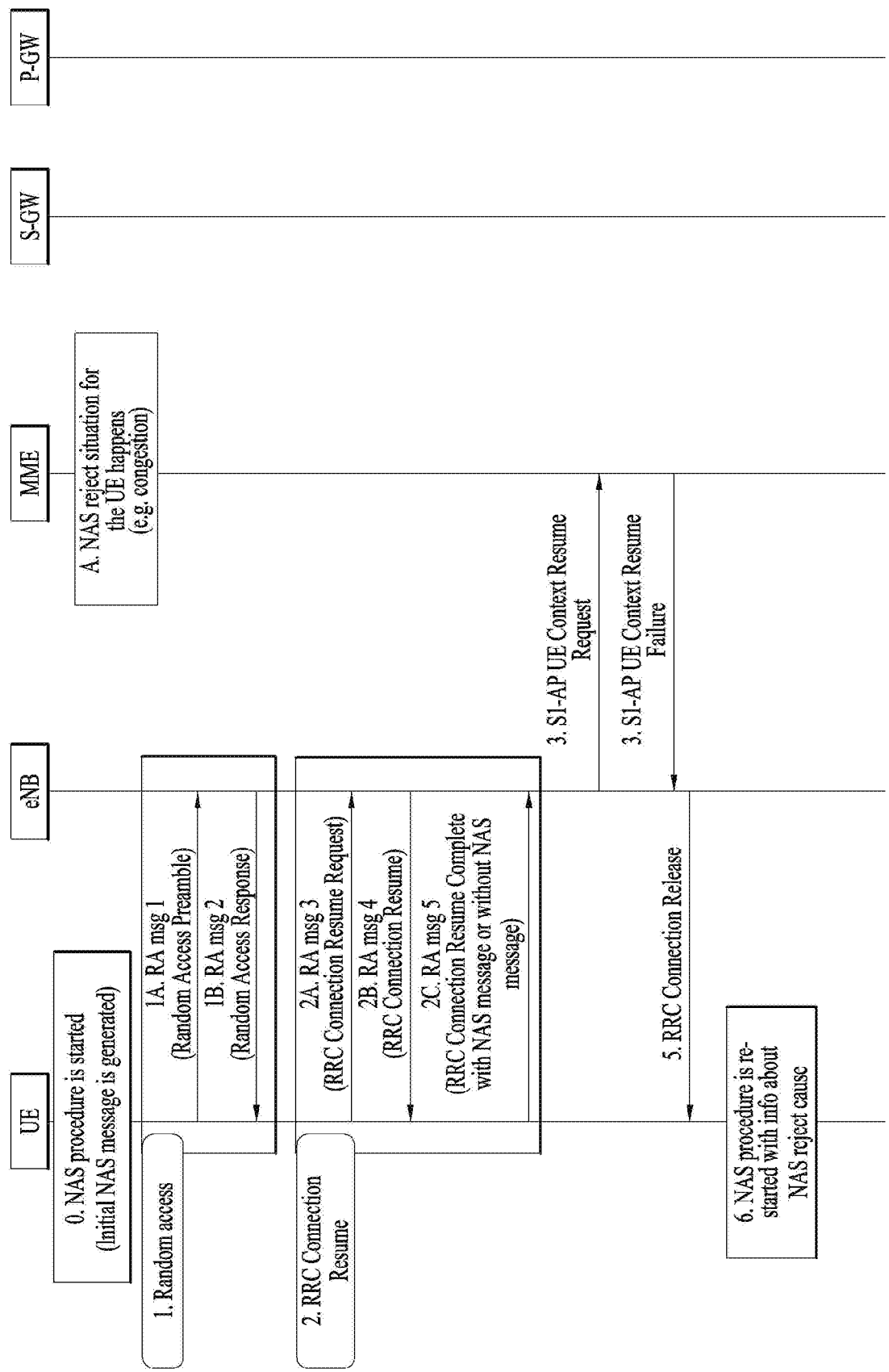
FIG. 16 is a conceptual diagram illustrating a connection resume procedure according to an embodiment of the present invention.

FIG. 16 is a conceptual diagram illustrating the connection resume procedure according to an embodiment of the present invention.

Referring to FIG. 16, the order for performing the connection resume procedure is as follows.

1. UL data to be transferred by the UE may occur. If the UE (NAS layer is in the EMM-Idle mode having the suspend indication message, the connection resume procedure starts.
2. The UE (AS layer) may transmit "RA msg1" to the eNB so as to perform a random access procedure.
3. The eNB may transmit "RA msg2" to the UE(AS layer).
4. After the UE(AS layer) has successfully performed the random access procedure, the UE may transmit the RRC Connection Resume Request message having a Resume ID to the eNB through "RA msg3".
5. If it is determined that the eNB can resume the UE context through the Resume ID, the eNB may inform the UE (AS layer) through an RRC Connection Resume Complete message (RA msg4). The eNB may inform the MME that the UE has resumed RRC connection through an S1-AP UE Context Active message.
6. If the MME has confirmed the UE and the eNB, the MME may transmit an S1-AP UE Context Active Acknowledgment message to the eNB, the UE may transition to the ECM-CONNECTED mode.
7. Upon receiving the UE Context Active Acknowledgment message, the eNB may perform an RRC configuration procedure.

If UL data to be transferred by the UE occurs, or if the UE receives the paging message from the MME, the UE may operate as follows.

A service request message occurs in the NAS layer and is then transferred to a lower layer (AS layer). In this case, RRC establishment cause and call type information may also be transferred to the lower layer (AS layer). Here, the RRC establishment cause and call type information may denote the objective for establishing RRC connection (or NAS connection), and may be used when the lower layer (AS layer) is connected to the network (i.e., eNB). The network (i.e., eNB) may determine the presence or absence of the connection request on the basis of the above RRC establishment cause and call type information.

The lower layer (AS layer) having received the service request message may designate the RRC establishment cause and call type information in the RRC connection request (RA msg3), and may then transmit the designated information to the eNB.

However, under the condition that UL data occurs or the UE receives the paging message from the MME, if the UE suspends RRC connection, the aforementioned service request procedure is not carried out and the connection resume procedure is carried out. In this case, "RA msg5" is not transmitted, and the MME is unable to receive the Service Request message. If the eNB admits the resume request (RA msg3) of the UE through "RA mag4" when the UE performs the service resume procedure, the eNB may transmit an S1-AP UE Context active message to the MME.

In this case, under the condition that the MME receives the S1-AP UE Context active message without receiving the service request message from the UE, if there is the situation in which transmission of a Service Reject message is needed, it is impossible to resume a necessary service using the single bearer, such that the MME may transmit a UE context resume failure message to the eNB instead of transmitting the service reject message. In this case, the eNB having received the UE context resume failure message performs the RRC release procedure, such that the MME is unable to transmit the service reject message. As a result, the following problems may occur.

1. Although the MME does not receive the service request message from the UE, if there is the situation in which the MME has to transmit the service reject message after receiving the S1-AP Context Active message, the MME is unable to transmit the service request message, such that the MME designates rejection of the S1-AP Context Active message in the S1-AP Context Active ack message acting as a response to the S1-AP Context Active message and then transmits the rejection designation message to the eNB.
2. The eNB having received the rejection designation message may perform the RRC connection release procedure.
3. After the UE having received the above information performs the RRC release procedure, the UE may determine a failure of the resume procedure, and may transmit the service request message to perform the service request procedure. The RRC procedure for transmitting the service request may additionally occur.
4. The MME having received the above information may transmit the service rejection message to the UE.

If the NAS request message is not actually transmitted although the NAS rejection situation has occurred in the above step 1, the MME has to perform only rejection of the S1-AP Context Active message without transmitting the NAS rejection message. As a result, unnecessary signaling may occur in the above steps 3 and 4.

If the MME is unable to resume the single E-RAB, the MME transmits the UE CONTEXT RESUME FAILURE message to the eNB, such that the UE context, the UE-associated logical S1-connection, and the associated bearer context are released. Upon receiving the UE CONTEXT RESUME FAILURE message, the eNB may perform the RRC connection release procedure, and may release all of the associated signaling and user data transport resources.

Figure 17:
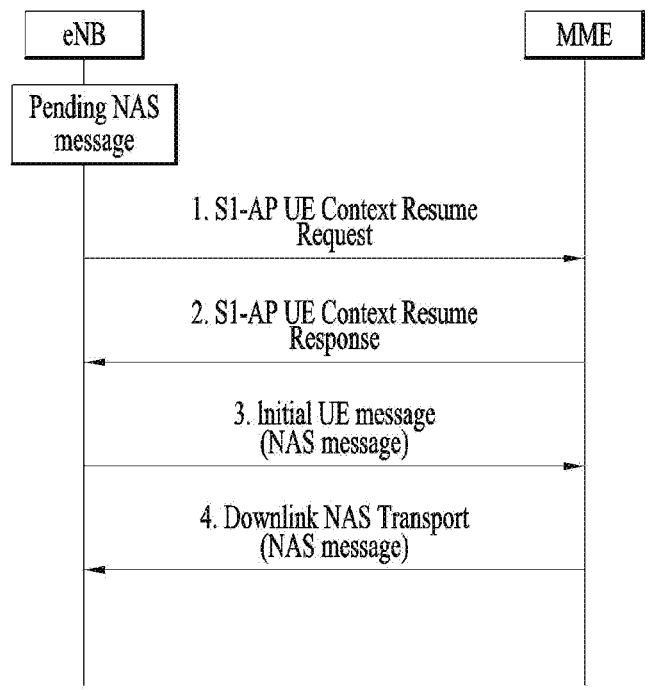
FIG. 17 is a conceptual diagram illustrating a method for transmitting a NAS message after the S1-AP duration was successfully resumed according to an embodiment of the present invention.

FIG. 17 is a conceptual diagram illustrating a method for transmitting a NAS message after the S1-AP duration was successfully resumed according to an embodiment of the present invention.

Figure 18:
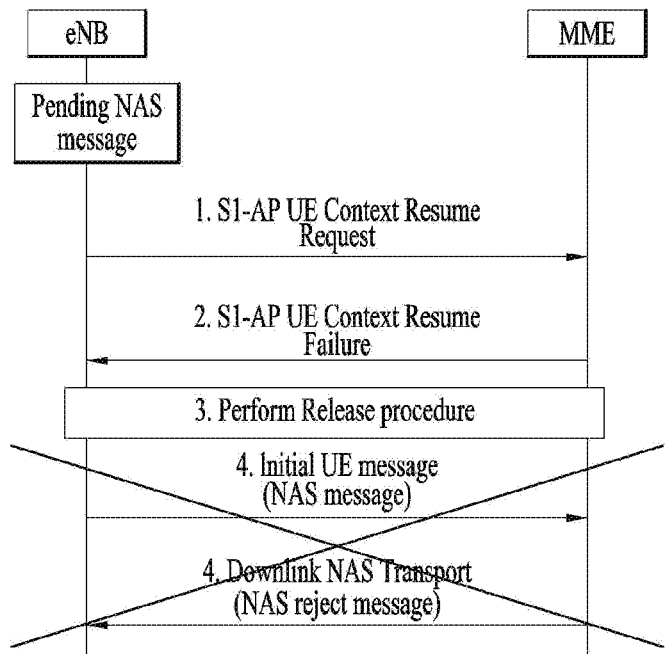
FIGS. 18 and 19 are conceptual diagrams illustrating an example of NAS message transmission failure after resume of the S1-AP duration failed according to an embodiment of the present invention.

Referring to FIG. 17, when RRC connection resume is admitted and the NAS message is transmitted, the S1-AP message may be transmitted according to the procedure of FIG. 18. After the resume procedure is first started and the resume procedure is stopped, the procedure for transmitting the NAS message is carried out.

Figure 19:
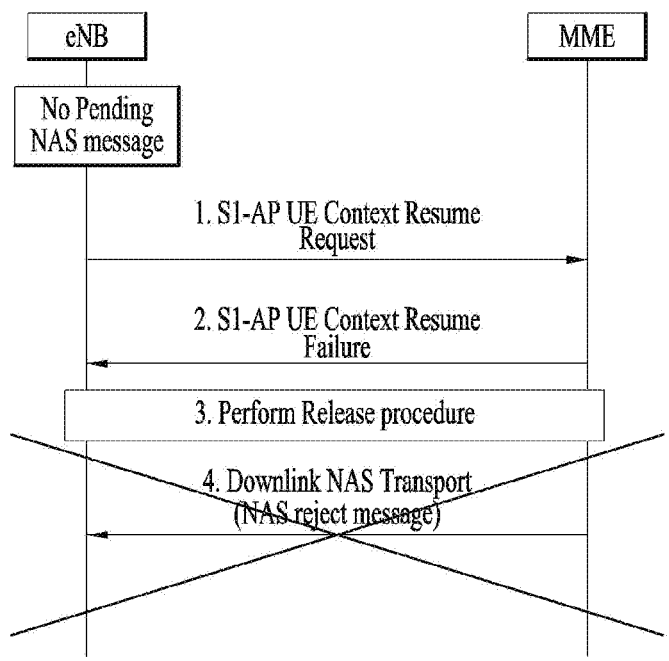

FIGS. 18 and 19 are conceptual diagrams illustrating an example of NAS message transmission failure after resume of the S1-AP duration failed according to an embodiment of the present invention.

Referring to FIG. 18, if S1-AP duration resume failure occurs, the following operations may be carried out. If the eNB receives the S1-AP UE Context Resume Failure message (Step 2), RRC connection and all signaling and data transport resources are released (Step 3). Thereafter, since the eNB performs S1-AP connection release, the eNB is unable to transmit the NAS message. In other words, the eNB is unable to transmit the initial UE message having the NAS message to the MME (Step 4). As a result, although the NAS message is not transmitted to the MME and NAS rejection for the corresponding UE occurs, it is impossible for the MME to transmit this information indicating non-transmission of the NAS message and NAS rejection occurrence to the eNB (Step 5). In FIG. 19, 'X' may denote non-execution of the corresponding procedure (Step 4 and Step 5).

Referring to FIG. 19, the NAS rejection situation may occur in the MME under the condition that the NAS message is not transmitted to the eNB. However, as soon as the MME transmits the S1-AP UE Context Resume Failure message to the eNB (Step 2), the eNB performs the release procedure (Step 3), such that it is impossible for the MME to transmit the NAS rejection message (Step 4). In FIG. 19. 'X' may denote non-execution of the corresponding procedure (Step 4).

There are two situations in which the MME performs such rejection.

1. Rejection of the S1-AP message: This means that the S1-AP message transmitted from the eNB was rejected. If the UE uses user plane EPS optimization, the S1-AP message may be the S1-AP Context Active message.
2. Rejection of the NAS message (e.g., the service request message): This means that the NAS message (e.g., the service request message) transmitted from the NAS layer of the UE was rejected. Referring to 3GPP standard document TS 24.301, when the MME receives the NAS message (i.e., the service request message), the UE having received cause and rejection messages about the rejection reason (situation) may operate in various ways according to various causes, and the UE operations based on causes are defined in the 3GPP standard document TS 24.301. In the present invention, the above-mentioned cases will hereinafter be referred to as "S1-AP rejection" and "NAS rejection", respectively.

If the UE uses user plane EPS optimization (or if the UE having the suspend indication message is in the EMM-IDLE mode), the UE may not transmit the service request message to the MME. However, when the MME receives the S1-AP context active message, there may occur the situation in which a legacy MME has to reject the NAS message (e.g., service rejection). However, a method for allowing the MME to transmit "NAS Rejection" to the UE has not yet been proposed. Accordingly, under the condition that the UE uses user plane EPS optimization (or under the condition that the UE suspends RRC connection), if there is the situation in which the MME has to reject the NAS message without receiving the NAS message (i.e., the service request message) from the UE, the following operations may be carried out to efficiently perform "NAS rejection".

In accordance with one embodiment of the present invention, if the UE uses user plane EPS optimization (or if the UE having the suspend indication message is in the EMM-IDLE mode), and if the UE (NAS layer) receives an indicator for indicating successful connection resume from the eNB, assuming that the situation of rejecting the NAS message occurs even when the MME receives the NAS message from the UE, the operation for efficiently performing "NAS rejection" can be carried out.

After the UE uses user plane EPS optimization (or if the UE having the suspend indication message is in the EMM-IDLE mode) and the eNB transmits the indicator indicating successful connection resume to the UE, the MME may recognize a request of the UE through the S1-AP Context Active message transmitted from the eNB. The present invention provides a method for simultaneously transmitting "S1-AP rejection" and "NAS rejection" after the S1-AP Context Active message was received by the MME.

The eNB may transmit the cause of NAS rejection to the UE through the transmitted S1-AP message and RRC signaling (RRC message).

Associated operations are as follows.

1. MME may confirm the cause appropriate for the service rejection situation according to a legacy operation. Thereafter, an IE (i.e., cause, T3446 timer) for NAS rejection may be included in the S1-AP message, and the resultant S1-AP message is transmitted by the MME. In order to transmit the resultant S1-AP message to the eNB, the MME may operate as follows.
   Transmission of 'S1-AP rejection': For example, a rejection message to the S1-AP UE Context Active message is designated in the S1-AP UE Context Active ack message, and the resultant S1-AP UE Context Active ack message is then transmitted.
   Transmission of 'NAS rejection': For example, an IE (i.e., cause, T3446 timer) for NAS rejection may be included in the S1-AP UE Context Active ack message, and the resultant S1-AP UE Context Active ack message may be transmitted to the eNB. Alternatively, an IE (i.e., cause, T3446 timer) for NAS rejection may be included in a separate S1-AP message (e.g., Downlink NAS Transport message or new S1-AP message), and the resultant message is then transmitted to the eNB. In another example, if a new S1-AP message is used, a new UE Context Active Failure message may be defined and the cause value for transmitting the IE associated with NAS rejection may be defined.
2. When the eNB receives a rejection message of the S1-AP Context Active message, 'NAS rejection IE (i.e., cause, T3446 timer)' may be contained in the RRC message, such that the resultant RRC message may be transmitted to the AS layer of the UE. For example, the RRC message may be an RRC connection release message. A separate cause (i.e., cause indicating release of NAS signaling connection) may be included in the RRC connection release message, and the resultant RRC connection release message may be transmitted.

In another example, the RRC message may be any one of a new RRC message or a legacy 'RRCConnectionReconfiguration/DLInformationTransfer' message. In this case, the RRC procedure for transmitting the RRC message including a NAS PDU may be carried out separately from the RRC connection release procedure.

3. If the AS layer of the UE receives the RRC message of the step 2, the UE may operate as follows. The following operations A and B may be simultaneously carried out or one of A and B may be carried out earlier than the other one as necessary. In the operation (A), the received 'NAS rejection IE (i.e. cause, T3446 timer)' information may be transmitted to the NAS layer of the UE. In the operation (B), the 'NAS rejection IE (i.e. cause, T3446 timer)' information and the cause information including 'release of the NAS signaling connection' are simultaneously transmitted to the NAS layer.
4. The UE NAS layer having received the above information may operate as if it has received not only the service rejection message about the operation (A) of step 3, but also 'NAS rejection IE (i.e. cause, T3446 timer)'. In regard to the operation (B) of step 4, the UE NAS layer may operate in the same manner as in the related art.

Figure 20:
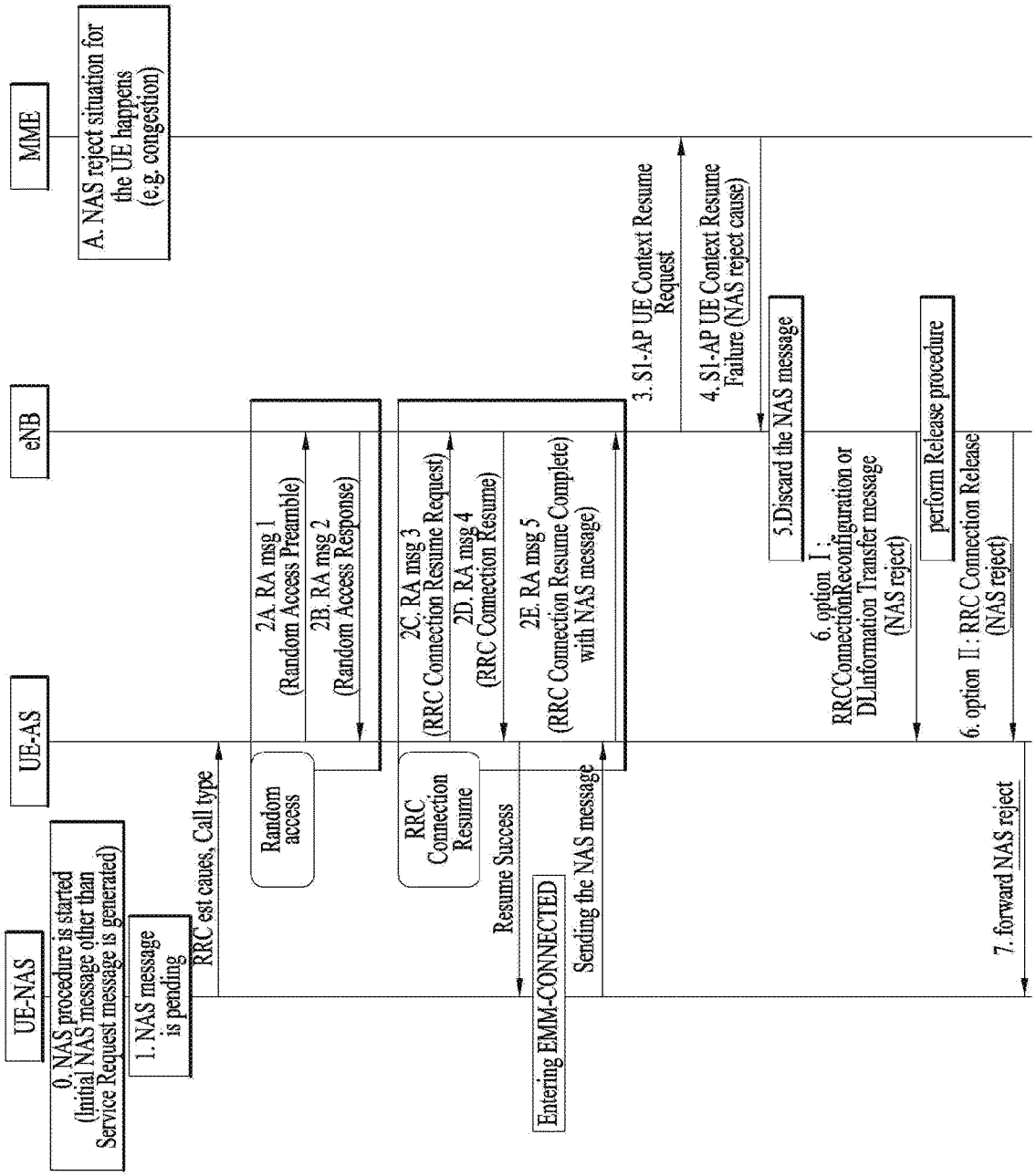
FIG. 20 is a conceptual diagram illustrating an example of resume failure encountered in the S1-AP duration according to an embodiment of the present invention.

FIG. 20 is a conceptual diagram illustrating an example of resume failure encountered in the S1-AP duration according to an embodiment of the present invention.

The exemplary case in which a resume failure occurs in the S1-AP duration after RRC resume was successful and the NAS message was transmitted to the eNB will hereinafter be described with reference to FIG. 20.

0. The NAS procedure of the UE staying in the EMM-IDLE mode with suspend indication may be triggered. In this case, another NAS message (e.g., the extended service request or TAU request message) instead of the service request message may be generated as the above NAS message.
1. NAS layer may perform pending of the corresponding NAS message, and may transmit the RRC establishment cause and call type information to the AS layer.
2. The AS layer having received the above information may perform the RACH procedure. If the RACH procedure is successfully performed, the AS layer may perform the resume procedure. If admission to the resume is received from the eNB, the AS layer may inform the NAS layer of the resume admission reception. The NAS layer having received the above information may transmit the pending NAS message to the AS layer. The AS layer having received the pending NAS message may encapsulate the NAS message into 'RA msg5', and may then transmit the encapsulated RA msg5 to the eNB.
3. The eNB may transmit the S1-AP UE Context Resume Request message to the MME.
4. Since there is the situation in which the MME is unable to resume even the single E-RAB, the MME may transmit the S1-AP UE Context Resume Failure message to the eNB. In this case, the NAS reject cause may also be included in the S1-AP UE Context Resume Failure message, such that the resultant S1-AP UE Context Resume Failure message is transmitted to the eNB.
5. The eNB may discard the NAS message having been received at step 2.
6. The eNB may transmit the corresponding NAS rejection message to the UE-AS layer using one of the following two methods composed of a first method and a second method. According to the first method indicating the case of using RRC connection release, the eNB includes the NAS rejection cause in the RRC connection release message and transmits the resultant RRC connection release message to the UE-AS layer during the release procedure caused by the S1-AP UE Context Resume Failure message having been received in step 4. According to the second method indicating the case of using the "RRCConnectionReconfiguration or DLInformationTransfer" message or the new RRC message, the eNB includes the NAS rejection cause in the corresponding RRC message and transmits the resultant RRC message to the UE-AS layer, and then performs the release procedure caused by the S1-AP UE Context Resume Failure message having been received in step 4.
7. The UE-AS layer may transmit the NAS rejection cause to the UE-NAS layer. The UE-NAS layer may recognize NAS rejection and the cause of the NAS rejection.

Figure 21:
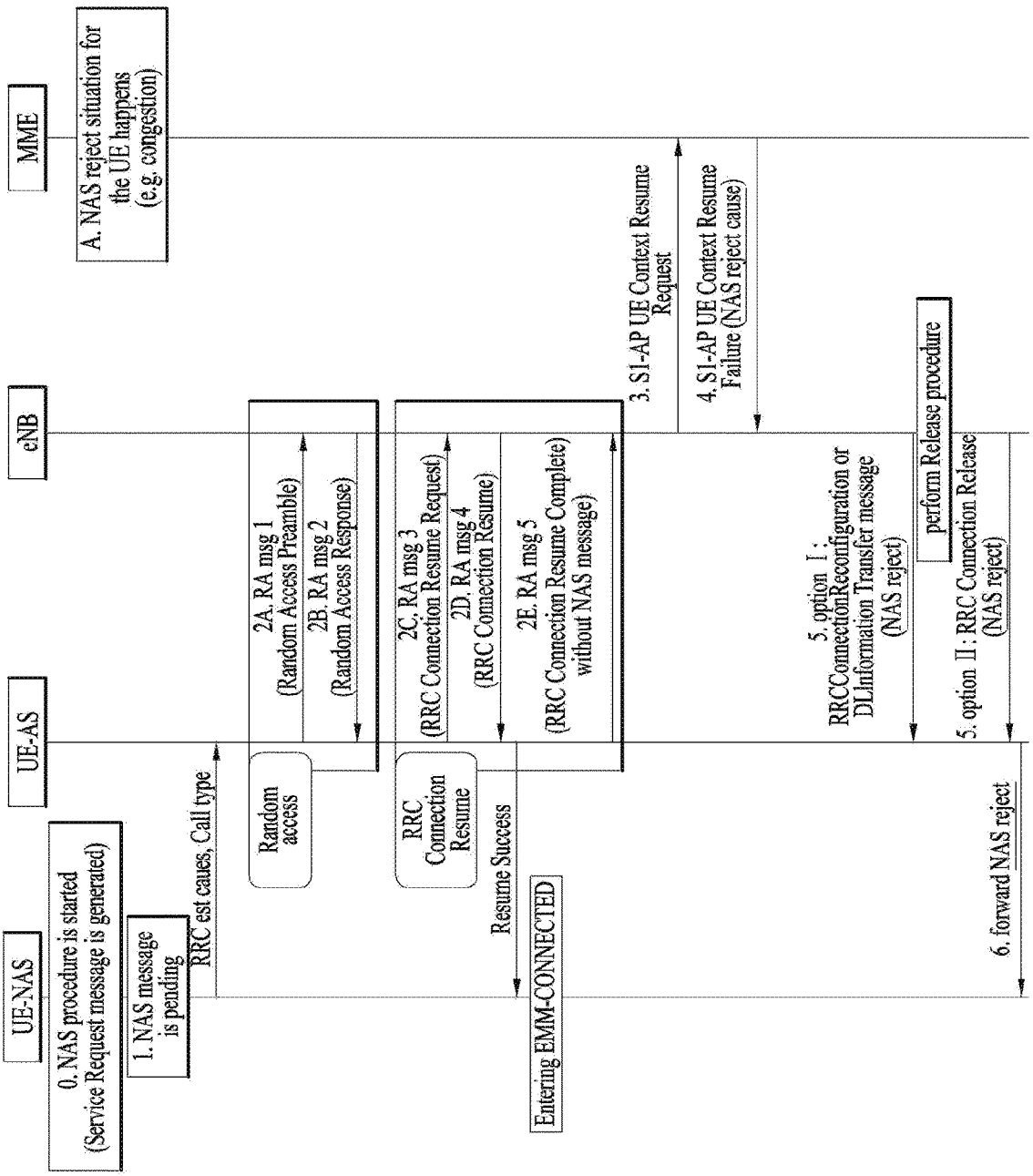
FIG. 21 is a conceptual diagram illustrating an example of resume failure encountered in the S1-AP duration according to another embodiment of the present invention.

FIG. 21 is a conceptual diagram illustrating an example of resume failure encountered in the S1-AP duration according to another embodiment of the present invention.

Referring to FIG. 21, when RRC resume was successful and the NAS message was not transmitted to the eNB, resume failure may occur in the S1-AP duration, and a detailed description thereof will hereinafter be given with reference to FIG. 21.

0. The NAS procedure of the UE staying in the EMM-IDLE mode with suspend indication may be triggered. In this case, the service request message may be generated as the NAS message.
1. NAS layer may perform pending of the corresponding NAS message, and may transmit the RRC establishment cause and call type information to the AS layer.
2. The AS layer having received the above information may perform the RACH procedure. If the RACH procedure is successfully performed, the AS layer may perform the resume procedure. If admission to the resume is received from the eNB, the AS layer may inform the NAS layer of the resume admission reception. The AS layer having received the above information may transmit 'RA mas5' to the eNB.
3. The eNB may transmit the S1-AP UE Context Resume Request message to the MME.
4. Since there is the situation in which the MME is unable to resume even the single E-RAB, the MME may transmit the S1-AP UE Context Resume Failure message to the eNB. In this case, the NAS reject cause may also be included in the S1-AP UE Context Resume Failure message, such that the S1-AP UE Context Resume Failure message is transmitted to the eNB.
5. The eNB may transmit the corresponding NAS rejection to the UE-AS layer. The eNB may transmit the corresponding NAS rejection message to the UE-AS layer using one of the following two methods composed of a first method and a second method. According to the first method indicating the case of using RRC connection release, the eNB includes the NAS rejection cause in the RRC connection release message and transmits the resultant RRC connection release message to the UE-AS layer during the release procedure caused by the S1-AP UE Context Resume Failure message having been received in step 4. According to the second method indicating the case of using the "RRCConnectionReconfiguration or DLInformationTransfer" message or the new RRC message, the eNB includes the NAS rejection cause in the corresponding RRC message and transmits the resultant RRC message to the UE-AS layer, and then performs the release procedure caused by the S1-AP UE Context Resume Failure message having been received at step 4.

6. The UE-AS layer may transmit the NAS rejection cause to the UE-NAS layer. The UE-NAS layer may recognize NAS rejection and the cause of the NAS rejection.

Figure 22:
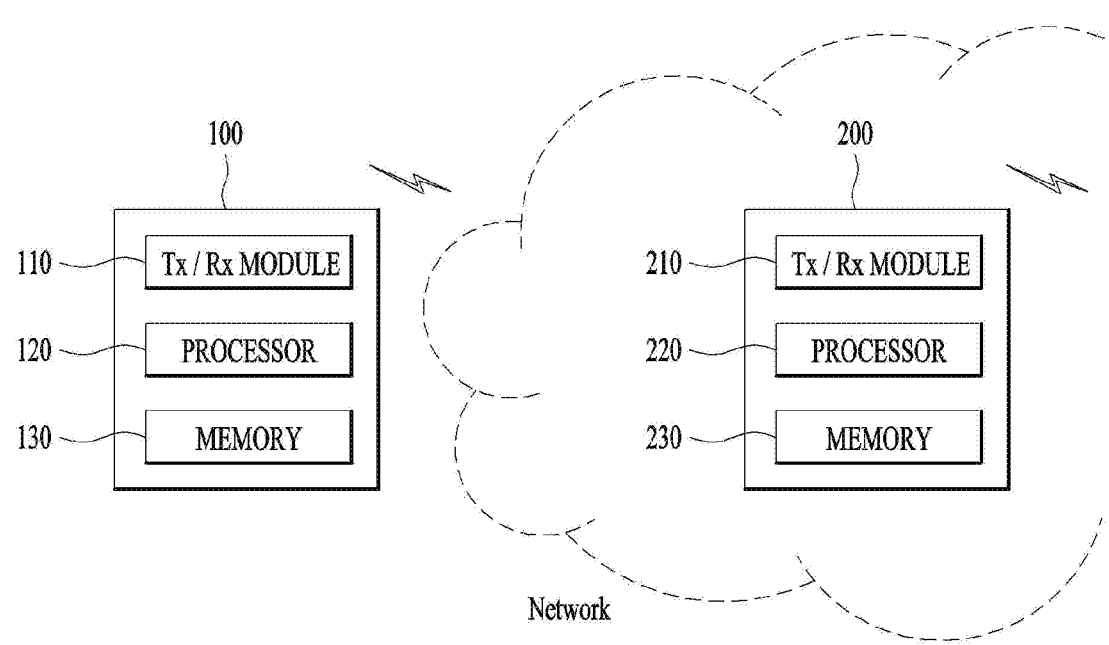
FIG. 22 illustrates a node according to an embodiment of the present invention.

FIG. 22 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 22, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present disclosure is applicable not only to 3GPP systems, but also to various wireless communication systems including IEEE 802.16x and 802.11x systems. Moreover, the proposed method can also be applied to mmWave communication using an ultra-high frequency band.

What is claimed is:

1. A method for performing a radio resource control (RRC) connection resume procedure by a base station (BS) in a wireless communication system, the method comprising:
    performing a procedure for resuming RRC connection to a user equipment (UE);
    transmitting a resume request message to a mobility management entity (MME);
    receiving a resume failure message from the MME based on the resume request not being admitted; and
    transmitting an RRC message including a non-access stratum (NAS) rejection cause to the UE,
    wherein the NAS rejection cause is included in the resume failure message.

2. The method according to claim 1, wherein the RRC message is at least one of an RRC connection reconfiguration message or a downlink (DL) information transfer message.

3. The method according to claim 1, further comprising:
    performing an RRC connection release procedure based on the resume failure message.

4. The method according to claim 3, wherein:
    based on the RRC connection release procedure being performed before the RRC message is transmitted to the UE, the RRC message relates to an RRC connection release message.

5. The method according to claim 1, wherein the performing the RRC connection resume procedure includes:
    receiving an RRC connection resume complete message from the UE.

6. The method according to claim 5, wherein:
    based on the RRC connection resume complete message including a NAS message, the NAS message is discarded after reception of the resume failure message.

7. The method according to claim 1, wherein the resume request message relates to an S1-AP UE context resume request message.

8. The method according to claim 1, wherein the resume request message or the resume failure message does not include a NAS message.

9. The method according to claim 1, wherein the resume failure message relates to an S1-AP UE context resume failure message.

10. The method according to claim 1, wherein the resume failure message further includes a back-off timer value.

11. A base station (BS) for performing a radio resource control (RRC) connection resume procedure in a wireless communication system, the BS comprising:

a radio frequency (RF) unit; and a processor configured to control the RF unit, wherein the processor is further configured to perform a procedure for resuming RRC connection to a user equipment (UE), transmit a resume request message to a mobility management entity (MME), receive a resume failure message from the MME based on the resume request not being admitted, and transmit an RRC message including a non-access stratum (NAS) rejection cause to the UE, wherein the NAS rejection cause is included in the resume failure message.

* * * * *